Nov. 18, 1930.  E. J. ANTONI  1,781,743
PLANT THINNER
Filed July 1, 1929  3 Sheets-Sheet 1
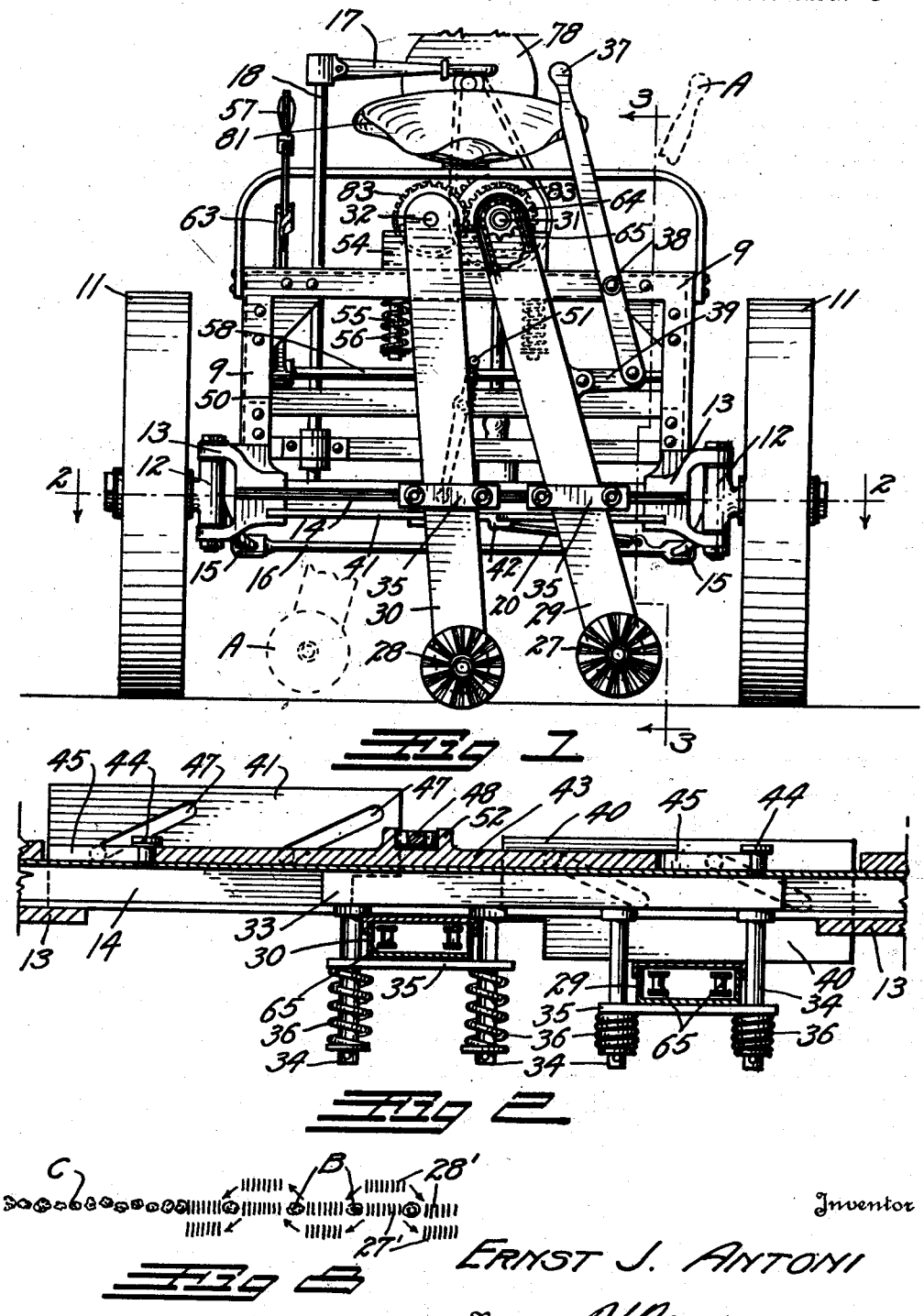
Inventor
ERNST J. ANTONI
By
Attorney Nov. 18, 1930.  E. J. ANTONI  1,781,743

PLANT THINNER

Filed July 1, 1929  3 Sheets-Sheet 2

Inventor
ERNST J. ANTONI
By
Attorney

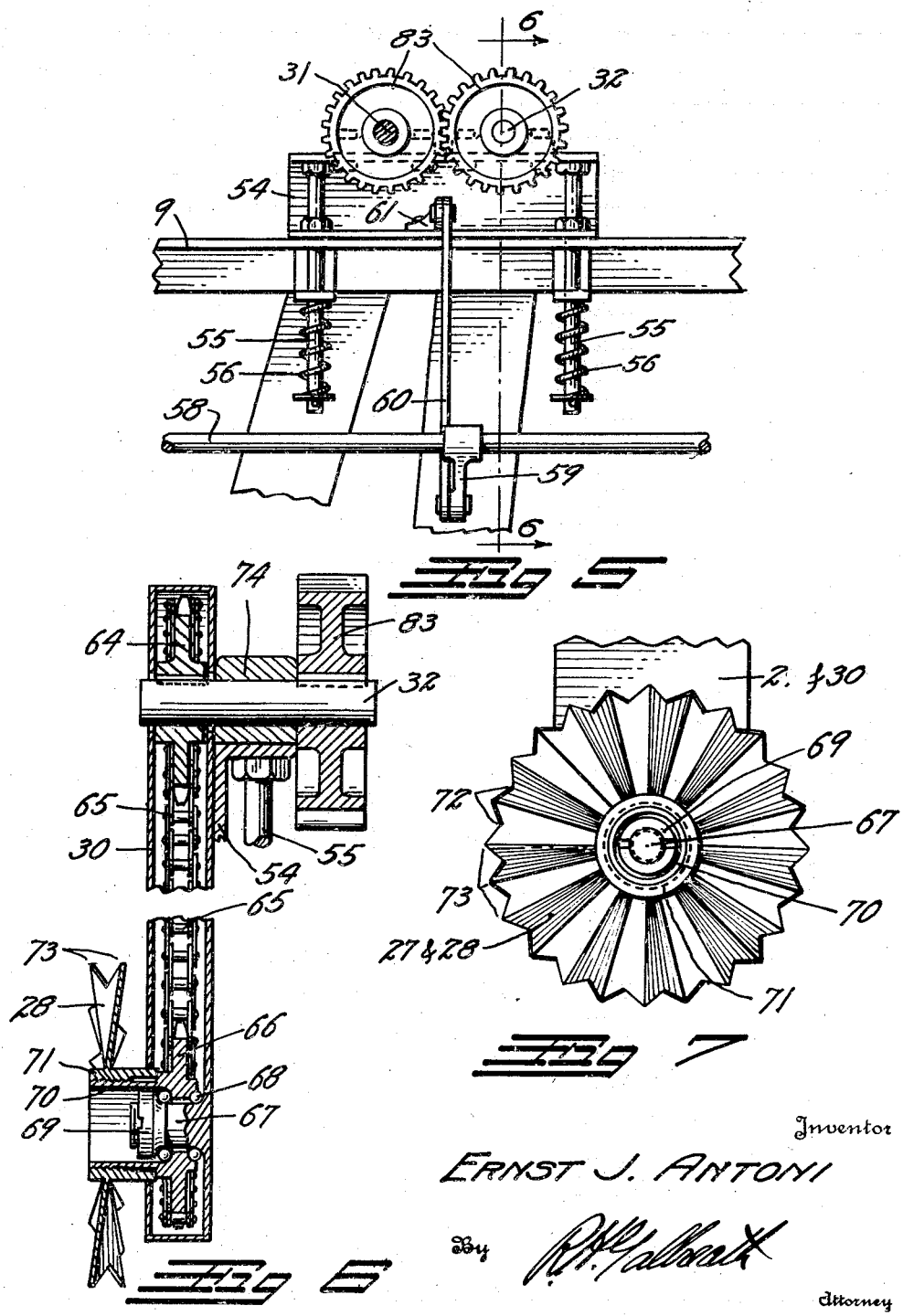

Patented Nov. 18, 1930

1,781,743

UNITED STATES PATENT OFFICE

ERNST J. ANTONI, OF DENVER, COLORADO

PLANT THINNER

Application filed July 1, 1929. Serial No. 375,019.

This invention relates to a machine for thinning or routing any type of plant or vegetable planted in rows. It is more particularly designed for use in thinning sugar beets.

The usual type of beet blocking or thinning machine operates automatically to separate the row into predetermined spaces. Machines of this character are not desirable since the usual row of plants is not uniform and the automatic machine will leave spaces where there are no plants and block out spaces where the best plants have started. The principal object of this invention is to provide a machine which the operator can control so as to thin the row in desired places and leave preferred plants.

Another object is to so construct the machine that it will be self propelling and can be easily guided along the plant row.

A further object is to provide positively driven rakes or cutters which will move both laterally and longitudinally of the plant row and act to pull or cut away the weeds and undesired plants and simultaneously cultivate the soil about the remaining plants.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front elevation of the invention.

Fig. 2 is an enlarged horizontal section through the front axle member taken on the line 2—2, Fig. 1.

Fig. 5 is an enlarged rear elevation of the forward frame taken on the line 5—5, Fig. 3.

Fig. 6 is an enlarged fragmentary vertical section through one of the chain housings taken on the line 6—6, Fig. 5.

Fig. 7 is an enlarged detail front elevation illustrating the type of rake wheels employed in the machine.

Fig. 8 is a diagrammatic view of a plant row illustrating the operation of the invention.

Figure 3:
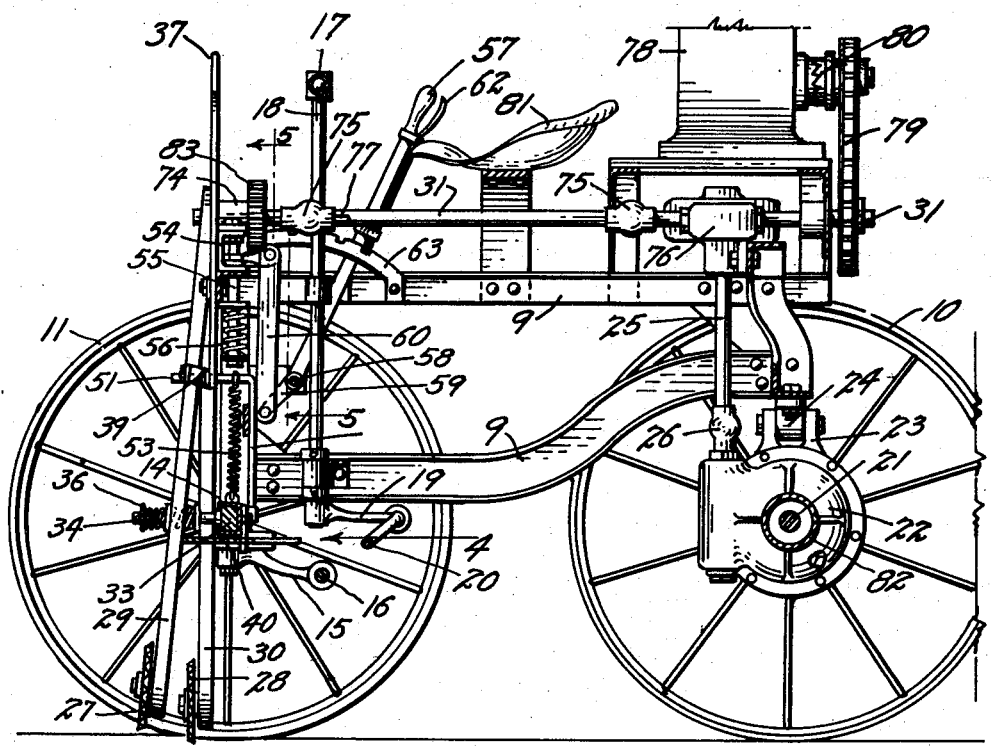
Fig. 3 is a vertical cross section through the machine taken on the line 3—3, Fig. 1.

The invention comprises a frame 9 formed of suitable structural members and supported upon rear drive wheels 10 and front guide wheels 11. The front guide wheels 11 are supported on steering spindles 12 pivotally mounted in spindle castings 13. The spindle castings 13 are secured on the extremities of a hollow channel shaped front axle member 14. Steering arms 17 project from the spindles 12 and are connected together by means of a cross rod 16 similar to the usual automobile steering gear construction.

The machine is guided from a suitable guide lever 17 carried on a vertical guide shaft 18. The guide shaft 18 is provided with a steering lever 19 at its lower extremity which in turn connects through a steering rod 20 to the cross rod 16, so that any movement of the lever 17 will cause the front wheel spindles 12 to rotate in the spindle castings 13 to guide the machine.

The rear axle construction is also similar to the usual automobile design and comprises an axle housing 82 in which axle shafts 27 lead from the drive wheels 10 to a suitable differential gear within a differential housing 22 positioned midway between the wheels 10. It is not believed necessary to illustrate or describe in detail the differential gear construction since this may be any of the usual types for obtaining a differential action between the drive wheels 10. Upon the differential housing 22 a clevis 23 is formed which hingedly supports the rear extremity of the frame 9 upon a bearing 24 so that the wheels 10 may pass over uneven ground without rocking or straining the frame 9.

Power is supplied to the differential gearing and rear axle 21 from a vertical propeller shaft 25 which is provided with any suitable universal joint 26. The joint 26 is placed opposite the bearing 24 so as to allow the shaft to flex with the movements of the rear axle. The actual thinning or raking is accomplished by means of corrugated rake wheels 27 and 28 to be later described. The rake wheels are carried on the extremities of chain housings 29 and 30 immediately in front of the front axle 14. The chain housing 29 is suspended from a drive shaft 31. The chain housing 30 is suspended from a countershaft 32.

A sliding bar 33 is positioned within the hollow of the channel of the front axle and is arranged to slide within the axle 14 lengthwise thereof. Spring studs 34 project from the front of the sliding bar 33, at each side of each of the chain housings 29 and 30. The chain housings are maintained in position on the sliding bar 33 by means of clamp plates 35 which extend between the studs 34 and are forced against the housings by means of compression springs 36.

The rake wheels 27 and 28 can be swung from side to side by means of a rake lever 37, as illustrated in broken line at "A" Fig. 1, so that each of the rake wheels will alternately come in alignment with the center of the machine. The rake lever 37 is pivoted on the frame 9 at 38 and connects with the chain housing 29 through a link 39. Thus, movement of the lever 37 will be transmitted to the chain housing 29 and from it through the sliding bar 33 to the chain housing 30 so that both housings and both rake wheels will swing in unison.

Figure 4:
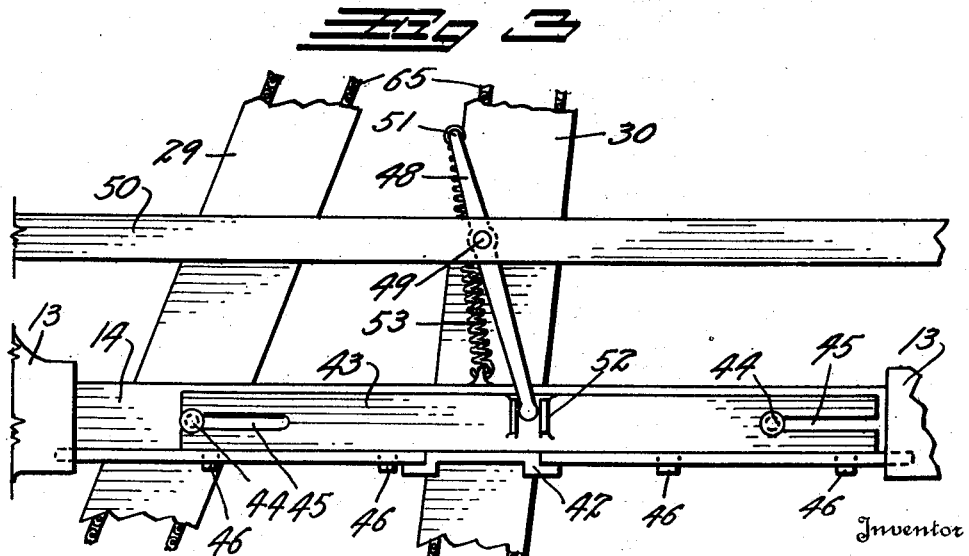
Fig. 4 is an enlarged rear elevation of the front axle looking in the direction of the arrow 4, Fig. 3.

It is desired to have each of the rake wheels, as it swings toward the center, positioned so that it will swing outwardly ahead of the previous rake wheel so as to leave a space in the plant row. This is accomplished by means of cam plates 40 and 41 which are slidably mounted immediately below the front axle 15. The plates 40 and 41 are supported in the spindle castings 14 and in a central slide member 42 (see Fig. 4). The cam plates 40 and 41 are alternately forced forward by means of a reciprocating plate 43 slidably mounted upon the rear of the front axle by means of headed studs 44 and slots 45. The reciprocating plate 43 carries a series of downwardly projecting studs 46 which enter into diagonal grooves 47 in the cam plates 40 and 41.

Thus, when the reciprocating plate is moved to the left, as in Fig. 2, the studs 46 will travel in the grooves 47 and force the plate 40 forward and the plate 41 rearward. When the reciprocating plate 43 is moved to the right it will similarly act to force the plate 41 forward and the plate 40 rearward.

Reciprocation is imparted to the plate 43 by the swinging of the chain housings 29 and 30 through the medium of a swinging lever 48. The swinging lever 48 is pivoted at 49 to a cross member 50 of the frame 9. It is provided with a forwardly extending extremity 51 which projects forwardly between the chain housings 29 and 30, so that the housings will alternately contact therewith as they are swung and thus operate the reciprocating bar 43. The lower extremity of the swinging lever 48 extends between lugs 52 on the reciprocating bar 43. A tension spring 53 extends between the extremity 51 of the swinging lever 48 and the front axle 14 so that the swinging lever is maintained in either of its side positions as soon as it is forced past the dead center point.

The rake wheels 27 and 28 can be lifted from or projected into the ground by means of a lifting block 54. The drive shaft 31 and the countershaft 32 are mounted in bearings 74 on the lifting block 54. The lifting block 54 is provided with downwardly projecting posts 55 which extend through the frame 9 and are provided with compression springs 56 which act to constantly pull the lifting block 54 downwardly against the frame 9. The block may be lifted by the operation of a depth lever 57 which is secured on a depth shaft 58 extending across the frame 9. The depth shaft 58 is provided with an arm 59 which connects with one extremity of a link 60. The other extremity of the link 60 is connected with a bracket 61 on the lifting block 54. Thus, operation of the lever 57 will raise or lower the lifting block 54 and consequently raise or lower the rake wheels 27 and 28. The depth lever is provided with the usual latch 62 and quadrant 63 to maintain it in any desired position.

Drive sprockets 64 are keyed upon the forward extremities of the drive shaft 31 and the countershaft 32 and connect by means of suitable chains 65 with idler sprockets 66 positioned within the lower extremities of the chain housings 29 and 30. The idler sprockets 66 are supported on stub shafts 67 within the chain housings and ride upon ball bearings 68. Adjustable ball races 69 are threaded upon the stub shafts 67 to maintain the bearings 68 and the sprockets 66 in position. Each of the sprockets 66 is provided with a forwardly projecting sleeve 70 which extends around the ball race 69 to support a rake wheel. The rake wheels 27 and 28 are provided with hubs 71 which can be threaded or otherwise secured on the projecting sleeve 70. Thus, rotation of the drive sprockets 64 will rotate the rake wheels 27 and 28. The drive sprockets 64 are caused to rotate in unison and in opposite directions by means of spur gears 83.

It is desired to call attention to the peculiar construction of the rake wheels. They preferably comprise serrated, corrugated discs, the serrations of which extend into each of the corrugation surfaces as indicated at 72 so as to provide two series of pointed teeth 73. One series being on the forward face of the wheel, the other on the rearward face thereof. The teeth 73 act to tear and rake the soil so as to uproot and remove any weeds or plants in their path. The action of the rake wheels closely approximates the action of a rake in that the plants are pulled and uprooted by the teeth 73 and are not cut off as by a hoe.

The drive shaft 31 extends rearwardly from one of the spur gears 83 through a pair of universal joints 75 and through a gear box 76. The universal joints 75 allow the shaft to bend to conform to the movements of the lifting block 54. Within the gear box 76 any suitable gears may be positioned which will act to transmit power from the drive shaft 31 to the propeller shaft 26. As illustrated, the gear box 76 encloses a worm upon the shaft 31 which meshes with a worm gear upon the shaft 26. The drive shaft 31 should be extendible so as to accommodate for the lift of the lift block. This can be accomplished in any of the usual ways such as by providing splines at one of the joints 75 which will travel in spline grooves, such as illustrated at 77, in the shaft 31.

The drive shaft 31 can be driven from any desired source of power, such as by means of a gasoline engine, positioned as indicated at 78, which will connect through a drive belt or chain 79 with the drive shaft 31. It is preferred that the engine 78 be one of the standard types provided with an integral clutch 80 so that it can be disconnected from the machine when desired. A convenient seat 81 is provided for the operator.

Operation

The operator guides the machine along a row of plants, with the wheels straddled on each side of the row, by means of the steering lever 18. He adjusts the depth at which he desires to weed or thin the plants by means of the lever 57. Assume that the rake wheel 28 is at the center point and is traveling along the line of plants breaking, pulling, and destroying the plants and weeds and cultivating the soil. When a suitable space has been covered or when a particularly desirable plant is reached the lever 37 is operated. This immediately withdraws the rake wheel 28 and swings the rake wheel 27 into position. Owing to the fact that each incoming rake wheel is forced ahead of the one already operating by the cam blocks 40 and 41, the incoming rake wheel 27 will approach the row of plants ahead of the previous position of the rake wheel 28. As the rake wheel 27 reaches the center it will leave the cam plate and drop to a position against the front axle 14. By this time the entire machine will have traveled forward a sufficient distance along the row so that the desired plant will not be touched by the incoming wheel 27 and a space will be left in the row. The wheel 27 is now left in position until it is desired to leave another plant or plants in the row when the operation will be reversed.

As the chain housing 30 leaves the center of the machine the chain housing 29 will approach the center in a forward position sliding along the forward edge of the cam disc 40. As it approaches the central position it will contact with the swinging lever 48 and as it leaves the cam plate to drop against the axle it will throw the swinging lever 48 to the opposite side, thus withdrawing the cam plate 40 and forcing the cam plate 41 and the opposite chain housing 30 outwardly. As the chain housing 29 leaves the central position it will slide over the withdrawn plate 40 until the housing 30 strikes the lever 48 to force the plate 40 again forward. It will be noted that as each chain housing leaves its cam plate it will be forced backwardly with a sharp movement by the springs 36 which serves to shovel soil up about the remaining plant so as to protect and cultivate it.

It will be noted that the action of the rake wheels upon the soil is a combination of four movements. First, the rotation of the wheels themselves; second, the side to side swing of the chain housings; third, the action of the cam plates and springs 36; and fourth, the forward motion of the machine itself. The machine, therefore, has a highly efficient action which effectively uproots the plants and weeds and breaks up and pulverizes the soil about the remaining plants.

Fig. 8 is a diagrammatic plan view of a plant row illustrating the operation of the invention thereon. In this view the respective paths of the rake wheels 27 and 28 are illustrated by two series of hatched lines 27' and 28' respectively. The spaced or thinned plants are indicated at "B", while the unthinned row of plants is indicated at "C".

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A plant thinning machine comprising: a wheel supported main frame; arms suspended from said main frame and arranged to swing laterally of the line of travel thereof for movement into and out of engagement with a plant row; means for swinging said arms; positively driven rake wheels carried on the lower extremities of said arms; and means operated by swinging movement of each of said arms into cultivating position for forcing and maintaining the respective arms forward of their respective planes of movement.

2. A plant thinning machine comprising: a wheel supported main frame; arms suspended from said main frame and arranged to swing laterally of the line of travel thereof; means for swinging said arms; positively driven rake wheels carried on the lower extremities of said arms; cam plates arranged to move forwardly and backwardly and contact with said arms; and means for operating said cam plates from the movements of said arms.

3. A plant thinning machine comprising: a wheel supported main frame; arms suspended from said main frame and arranged to swing laterally of the line of travel thereof; means for swinging said arms; positively driven rake wheels carried on the lower extremities of said arms; cam plates arranged to move forwardly and backwardly and contact with said arms; a laterally reciprocating plate having projections arranged to encounter diagonal surfaces on said cam plates so as to force said cam plates forwardly and rearwardly as said reciprocating plate moves laterally; and means for reciprocating said reciprocating plate from the movements of said arms.

4. A plant thinning machine comprising: a wheel supported main frame; arms suspended from said main frame and arranged to swing laterally of the line of travel thereof; means for swinging said arms; positively driven rake wheels carried on the lower extremities of said arms; cam plates arranged to move forwardly and backwardly and contact with said arms; a laterally reciprocating plate having projections arranged to encounter diagonal surfaces on said cam plates so as to force said cam plates forwardly and rearwardly as said reciprocating plate moves laterally; a swinging lever pivoted intermediate its extremities one extremity of said lever arranged to contact with said arms, the other extremity being in contact with said reciprocating plate so that movements of the former will be communicated to the latter.

5. A plant thinning machine comprising: a wheel supported main frame; arms suspended from said main frame and arranged to swing laterally of the line of travel thereof; means for swinging said arms; positively driven rake wheels carried on the lower extremities of said arms; cam plates arranged to move forwardly and backwardly and contact with said arms; means for operating said cam plates from the movements of said arms; and springs arranged to maintain said arms in engagement with said cam plates.

6. A plant thinning machine comprising: a main frame; wheels supporting said frame; a drive shaft supported by said frame; a swinging arm suspended from said shaft; a rake wheel on the lower extremity of said swinging arm; means for transmitting power through said arm from said drive shaft to said rake wheel; means for swinging said arm; means for adjusting the height of said drive shaft so as to vary the amount of contact between said rake wheel and the ground; said latter means comprising: a lift block supporting said drive shaft and vertically slidable upon said main frame and means for varying the height of said lift block.

7. A plant thinning machine comprising: a main frame; wheels supporting said frame; a drive shaft supported by said frame; a swinging arm suspended from said shaft; a rake wheel on the lower extremity of said swinging arm; means for transmitting power through said arm from said drive shaft to said rake wheel; means for swinging said arm; means for adjusting the height of said drive shaft so as to vary the amount of contact between said rake wheel and the ground; said latter means comprising: a lift block supporting said drive shaft and vertically slidable upon said main frame; and a lever operatively connected to said lift block.

8. A plant thinning machine comprising: a wheel supported main frame; a lift block vertically movable upon said main frame; a drive shaft journaled on said lift block; a countershaft journaled on said lift block; gears operatively connecting said shafts; a chain housing extending downwardly from each of said shafts; a rake wheel journaled in the lower extremity of each of said housings; a sprocket on each of said shafts; a sprocket connected to each of said rake wheels; a chain in each of said chain housings for transmitting power between the shaft sprockets and the wheel sprockets; a sliding bar for causing said chain housings to swing in unison; means for swinging said chain housings; and means for rotating said drive shaft.

In testimony whereof, I affix my signature.

ERNST J. ANTONI.